(12) United States Patent
Sako et al.

(10) Patent No.: US 12,305,560 B2
(45) Date of Patent: May 20, 2025

(54) MAT MATERIAL, METHOD OF MAKING SAME, POLLUTION CONTROL APPARATUS AND THERMAL INSULATION

(71) Applicant: 3M INNOVATIVE PROPERTIES COMPANY, St. Paul, MN (US)

(72) Inventors: Kenji Sako, Tokyo (JP); Shailendra B. Rathod, St. Paul, MN (US); Peter T. Dietz, Eagan, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 17/251,504

(22) PCT Filed: Jun. 19, 2019

(86) PCT No.: PCT/US2019/037870
§ 371 (c)(1),
(2) Date: Dec. 11, 2020

(87) PCT Pub. No.: WO2019/246180
PCT Pub. Date: Dec. 26, 2019

(65) Prior Publication Data
US 2021/0246819 A1  Aug. 12, 2021

Related U.S. Application Data

(60) Provisional application No. 62/687,829, filed on Jun. 21, 2018.

(51) Int. Cl.
*B32B 7/12* (2006.01)
*F01N 3/28* (2006.01)
(Continued)

(52) U.S. Cl.
CPC ......... *F01N 3/2871* (2013.01); *F01N 3/2857* (2013.01); *B32B 5/26* (2013.01);
(Continued)

(58) Field of Classification Search
CPC ... C09J 1/00; C09J 1/02; F01N 3/0211; F01N 3/2832; F01N 3/2835; F01N 3/2839;
(Continued)

(56) References Cited

U.S. PATENT DOCUMENTS 3,959,183 A * 5/1976 Gospodar ............. F01N 3/2846
422/177
3,961,907 A * 6/1976 Close .................... F01N 3/2864
138/108
(Continued)

FOREIGN PATENT DOCUMENTS

EP 0551532 7/1993
EP 1026218 8/2000
(Continued)

OTHER PUBLICATIONS

Machine translation of JP 2001/278680 A, obtained from J-PlatPat (Year: 2022).*

(Continued)

*Primary Examiner* — Z. Jim Yang
(74) *Attorney, Agent, or Firm* — Carlos M. Téllez Rodríguez; 3M Innovative Properties Company

(57) ABSTRACT

A mat material used in a sandwiched state between two members. The mat material includes a mat-like body portion having a first surface and a second surface, and an area containing an inorganic adhesive, with the area being formed on at least one of the first or second surface of the body portion, and the inorganic adhesive exhibits adhesiveness upon being heated.

10 Claims, 4 Drawing Sheets

(51) Int. Cl.
*B32B 5/26* (2006.01)
*F01N 13/14* (2010.01)

(52) U.S. Cl.
CPC ............. *B32B 7/12* (2013.01); *B32B 2262/10* (2013.01); *B32B 2307/304* (2013.01); *F01N 13/14* (2013.01); *F01N 2260/20* (2013.01)

(58) Field of Classification Search
CPC ................... F01N 3/2842; F01N 3/285; F01N 3/2853–2871; F01N 2350/04; F01N 2350/06; C04B 41/50–5092
See application file for complete search history.

(56) References Cited

U.S. PATENT DOCUMENTS

| | | | |
|---|---|---|---|
| 4,929,429 A * | 5/1990 | Merry | F01N 3/2864 422/221 |
| 4,999,168 A | 3/1991 | Ten Eyck | |
| 5,332,609 A | 7/1994 | Corn | |
| 5,486,413 A * | 1/1996 | Kelley | C09J 1/02 428/323 |
| 6,051,193 A | 4/2000 | Langer et al. | |
| 6,077,483 A * | 6/2000 | Locker | F01N 13/14 422/221 |
| 6,967,006 B1 * | 11/2005 | Wirth | F01N 3/2857 428/920 |
| 6,972,143 B2 | 12/2005 | Baldwin | |
| 7,854,905 B2 | 12/2010 | Yasuda et al. | |
| 8,277,925 B2 | 10/2012 | Dietz | |
| 9,670,814 B2 | 6/2017 | Sako | |
| 10,533,476 B2 | 1/2020 | Sako | |
| 2002/0009622 A1 * | 1/2002 | Goodson | C04B 28/34 428/689 |
| 2002/0025904 A1 | 2/2002 | Goto et al. | |
| 2004/0244909 A1 * | 12/2004 | Rhodes | C09J 7/21 156/325 |
| 2008/0178566 A1 * | 7/2008 | Okabe | B32B 1/08 156/60 |
| 2009/0025377 A1 * | 1/2009 | Yasuda | C04B 35/63424 60/299 |
| 2009/0049831 A1 | 2/2009 | Yasuda et al. | |
| 2009/0087353 A1 * | 4/2009 | Saiki | F01N 3/2857 422/177 |
| 2009/0148356 A1 * | 6/2009 | Okabe | F01N 3/2864 422/179 |
| 2009/0246095 A1 * | 10/2009 | Saiki | B32B 1/08 156/60 |
| 2009/0304560 A1 * | 12/2009 | Dietz | B32B 7/12 428/323 |
| 2010/0143212 A1 * | 6/2010 | Sakane | F01N 3/2853 264/296 |
| 2010/0150791 A1 * | 6/2010 | Kunze | C04B 41/52 422/179 |
| 2010/0166619 A1 * | 7/2010 | Dietz | C09J 7/21 156/289 |
| 2010/0186359 A1 * | 7/2010 | Dietz | F01N 3/2853 428/221 |
| 2011/0150715 A1 * | 6/2011 | Kumar | F01N 3/2853 428/221 |
| 2011/0182777 A1 * | 7/2011 | Dietz | C04B 41/5006 427/372.2 |
| 2012/0186239 A1 * | 7/2012 | Ando | F01N 3/2871 60/303 |
| 2012/0202045 A1 * | 8/2012 | Mutsuda | C23C 28/04 427/446 |
| 2013/0255210 A1 * | 10/2013 | Okabe | B01D 46/00 55/502 |
| 2014/0186599 A1 * | 7/2014 | Fukui | C04B 35/111 428/218 |
| 2014/0248189 A1 * | 9/2014 | Tomosue | F01N 3/2853 29/890 |
| 2015/0000259 A1 | 1/2015 | Dietz | |
| 2015/0151249 A1 * | 6/2015 | Makabe | B01D 53/885 29/890 |
| 2015/0210598 A1 * | 7/2015 | Tomosue | C04B 35/63416 501/153 |
| 2021/0388238 A1 * | 12/2021 | Shiozaki | B32B 7/12 |

FOREIGN PATENT DOCUMENTS

| | | | | |
|---|---|---|---|---|
| EP | 2363582 | | 9/2011 | |
| EP | 3051187 A1 * | | 8/2016 | .......... F01N 3/2839 |
| JP | 59010345 | | 1/1984 | |
| JP | 59126023 | | 7/1984 | |
| JP | 06129248 | | 5/1994 | |
| JP | H0713457 B2 * | | 2/1995 | |
| JP | 2000240439 | | 9/2000 | |
| JP | 2001278680 A * | | 10/2001 | .......... C04B 28/005 |
| JP | 2003056339 | | 2/2003 | |
| JP | 5761686 | | 8/2015 | |
| JP | 2017210815 | | 11/2017 | |
| WO | WO 00/011098 | | 3/2000 | |
| WO | WO 01/083956 | | 11/2001 | |
| WO | WO 2004/061279 | | 7/2004 | |
| WO | WO 2004/070176 | | 8/2004 | |
| WO | WO 2005/021945 | | 3/2005 | |
| WO | WO 2006/020058 | | 2/2006 | |
| WO | WO 2007/030410 | | 3/2007 | |
| WO | WO 2007/030583 | | 3/2007 | |
| WO | WO 2008/121801 | | 10/2008 | |
| WO | WO 2008/154078 | | 12/2008 | |
| WO | WO 2015/179589 | | 11/2015 | |
| WO | WO 2016/177861 | | 11/2016 | |
| WO | WO 2016/195970 | | 12/2016 | |
| WO | WO-2019131206 A1 * | | 7/2019 | .............. B32B 5/02 |

OTHER PUBLICATIONS

Datasheet on 3M Interam Mat Mount.*
Machine translation of JP H07/13457 B2.*
International Search Report for PCT International Application No. PCT/US2019/037870, mailed on Aug. 5, 2019, 5 pages.
"New Edition of Fine Chemicals", edited by Lu Shaofang and Long Deqing, Hubei Science and Technology Press, Feb. 2003, 10 pages.

* cited by examiner

MAT MATERIAL, METHOD OF MAKING SAME, POLLUTION CONTROL APPARATUS AND THERMAL INSULATION

CROSS REFERENCE TO RELATED APPLICATIONS

This application is a national stage filing under 35 U.S.C. 371 of PCT/US2019/037870, filed Jun. 19, 2019, which claims the benefit of U.S. Provisional Application No. 62/687,829, filed Jun. 21, 2018, the disclosures of which are incorporated by reference in their entireties herein.

TECHNICAL FIELD

The present disclosure relates to a mat material, a production method thereof, and a pollution control apparatus and a thermal insulation structure.

BACKGROUND ART

Exhaust gas from an automobile engine contains carbon monoxide (CO), hydrocarbons (HC), nitrogen oxides (NOx), and the like. Exhaust gas from a diesel engine further contains a particulate matter such as soot. As a means to remove them, an exhaust gas cleaning system using a ceramic catalytic converter or a diesel particulate filter (DPF) is known. In addition, mounting of a gasoline particulate filter (GPF) has also been investigated. These devices are generally called a pollution control apparatus.

In general, a pollution control apparatus (e.g., a ceramic catalytic converter) includes a pollution control element (e.g., a honeycomb-shaped catalyst carrier made of ceramic), a casing made of metal that encases the pollution control element, and a holding material packed in a gap between an outer circumferential surface of the pollution control element and an inner surface of the casing. The holding material holds the pollution control element in the casing to prevent mechanical shock due to impact, vibration, and the like from being inadvertently applied to the pollution control element. The holding material prevents the pollution control element from moving and breaking in the casing, providing desirable effects throughout an operating life of the pollution control element. This type of the holding material is also commonly called a mounting material. Such a holding material is generally a mat-like material including a single layer or multiple layers, and is used by being wrapped around the pollution control element.

The holding material generally includes inorganic materials such as inorganic fibers as a main constituent from the viewpoint of achieving excellent thermal insulation and heat resistance. Such a holding material (mounting material) is described, for example, in Patent Documents JP 57-61686 A, JP 2002-66331 A, and JP 2006-223920 A.

SUMMARY OF INVENTION

A holding material, in the art of mounting pollution control elements in the casing of a pollution control apparatus, has been designed to prevent a shift in position during use mainly by a compression repulsive force and friction force of the holding material. That is, a technique has been introduced, wherein a holding material, after it is encased together with a pollution control element in a casing, holds the pollution control element by a compression repulsive force on a surface of the other member (i.e., an inner surface of the casing and/or an outer surface of the pollution control element) with which the holding material is in contact such that the pollution control element does not move from a predetermined position.

An object of the present disclosure is to provide a mat material applied to an apparatus or a structure used under heating environment, with the mat material being capable of suppressing a shift in position of the mat material and other members in contact therewith during use. Another object of the present disclosure is to provide a method of producing such a mat material, and a device comprising the mat material (e.g., a pollution control apparatus and a thermal insulation structure).

One aspect of the present disclosure relates to a mat material. The mat material is used in a sandwiched state between two members. The mat material includes a mat-like body portion having a first surface and a second surface; and an area formed on at least one of the first and second surfaces of the body portion. This area contains an inorganic adhesive, and the inorganic adhesive exhibits adhesiveness upon being heated (e.g., being heated to the operating temperature of the device, or the environmental temperature of the thermal insulation structure, in which the mat material is used).

Another aspect of the present disclosure relates to a device including the mat material (e.g., a pollution control apparatus and a thermal insulation structure) described above. The pollution control apparatus can includes a casing; a pollution control element provided in the casing; and the above-mentioned mat material disposed between the casing and the pollution control element. The thermal insulation structure can includes a first member with a surface having a temperature potentially reaching 200° C. or higher; a second member having a surface opposite to the surface of the first member; and the above-mentioned mat material disposed between the first member and the second member.

Yet another aspect of the present disclosure relates to a method of making or producing a mat material. This production method can include providing a mat-like body portion having a first surface and a second surface; and coating a solution containing an inorganic adhesive onto at least one of the first surface or second surface of the body portion.

According to the present disclosure, a mat material applied to an apparatus or a structure used under heating environment is provided, and with the mat material, a shift in position of the mat material and other members in contact therewith during use can be completely prevented or significantly suppressed.

DESCRIPTION OF EMBODIMENTS

A mat material according to the embodiment is used in a sandwiched state between two members, the mat material including: a mat-like body portion having a first surface and a second surface; and an area formed on at least one of the first or second surface of the body portion, the area containing an inorganic adhesive; wherein the inorganic adhesive exhibits adhesiveness upon being heated. Application of the mat material to an apparatus or a structure used under heating environment can suppress a shift in position of the mat material and other members in contact therewith during use.

The mat material according to the embodiment is applied to devices such as a pollution control apparatus and a thermal insulation structure. The pollution control apparatus according to the present embodiment has a casing; a pollution control element provided in the casing; and the above-mentioned mat material disposed between the casing and the pollution control element. The thermal insulation structure includes: a first member having a surface having a temperature potentially reaching 200° C. or higher; a second member having a surface opposite to the surface of the first member; and the above-mentioned mat material disposed between the first member and the second member.

Embodiments of the present disclosure will be described below in detail with reference to the drawings.

Figure 1:
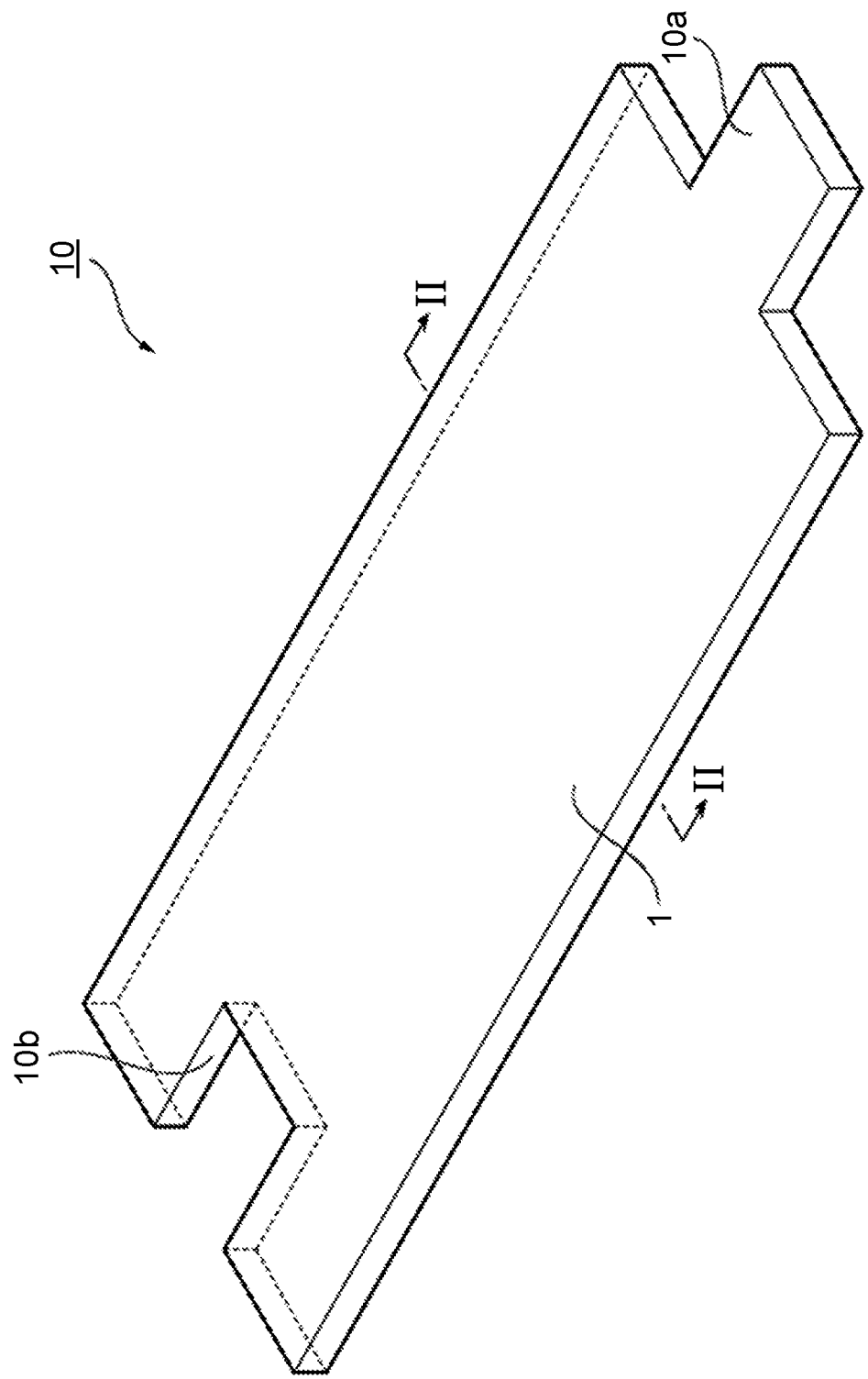
FIG. 1 is a perspective view illustrating one embodiment of the mat material according to the present disclosure.

FIG. 1 is a perspective view illustrating an example of the mat material of the present embodiment. The mat material 10 illustrated in this drawing is configured to be wrapped around a pollution control element 30 having a round cylindrical or elliptical cylindrical outer shape and to hold the pollution control element 30 in a casing 20 (refer to FIG. 3). The mat material 10 has a length that is in accordance with the length of the outer circumference of the pollution control element 30. The mat material 10 has a convex part 10*a* on one end, and a concave part 10*b* on the other end, for example, and has a shape such that the convex part 10*a* and the concave part 10*b* mutually mate when the mat material 10 is wrapped around the pollution control element 30. Note that other shapes such as an L shape are also possible, and the shape for the mating is not particularly limited.

Figure 2:
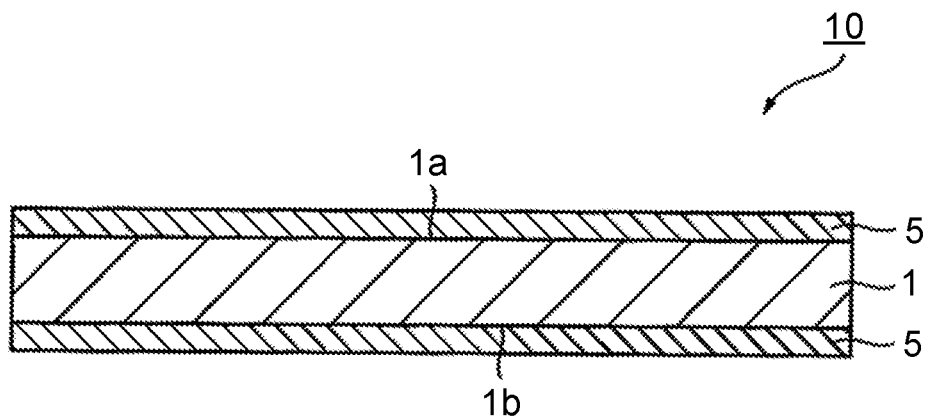
FIG. 2 is a schematic cross-sectional view along line II-II in FIG. 1.

The mat material 10, as illustrated in FIG. 2, includes a mat-like body portion 1, and surface layers 5 (areas containing an inorganic adhesive) as thick as about 5 to about 15 mm provided on both surfaces of the body portion 1. The body portion 1 has a first surface 1*a* and a second surface 1*b*. The body portion 1 includes inorganic fibers, which can have a diameter (e.g., an average diameter) from about 3 to about 10 μm. The body portion 1 can also include other components compounded as necessary. Each surface layer 5 includes an inorganic adhesive exhibiting adhesiveness upon being heated, and optionally other components compounded as necessary. Note that the mat material 10 may have the surface layer 5 only on one surface thereof. Alternatively, the mat material 10 may have the surface layer 5 on only a portion or part of the area of one surface or both surfaces 1*a* and 1*b*. In addition, FIG. 2 illustrates a state, in which the surface layers 5 are each laminated on the surface 1*a* and the surface 1*b*, but other states, in which the surface layers 5 is adhered to the surface 1*a* and/or the surface 1*b*, or a part of the surface layer 5 is impregnated into the body portion 1, may be possible.

As mentioned above, the surface layers 5 contains an inorganic adhesive exhibiting adhesiveness upon being heated. Inorganic adhesives described herein include those providing not only adhesion by the formation of reaction products with other members upon being heated, but also adhesion due to anchoring effect (fixed state), resulting from fluidity exhibited by an inorganic adhesive of the surface layer 5 upon being heated, and penetration into contact surfaces of surfaces of other members. The temperature at which adhesiveness is exhibited is not limited, but adhesiveness is exhibited, for example, at 200° C. or higher, 300° C. or higher, or 600° C. or higher. For example, the mat material 10 is arranged in a sandwiched state between the two members and is allowed to stand under a temperature condition of 600° C. for 1 hour. Then, the mat material 10 exhibits adhesiveness to other members. Exhibition of adhesiveness can be visually judged by checking whether a fixed area is formed between the mat material 10 and other members after the heated mat material 10 is cooled (see FIGS. 5 and 6).

The inorganic adhesive is generally in a liquid state at ordinary temperature, but the surface layer 5 is substantially dry on an unused mat material 10. Note that "substantially dry" herein refers to, for example, a dry state obtained by a drying process after coating the inorganic adhesive; for such a dry state, the mass loss after heating the mat material 10 at 120° C. for 30 min is within about 5% based on the mass of the mat material 10 before heating. The surface layer 5, as being substantially dry, has an advantage of excellent workability when assembling the mat material 10 to the device.

The above-mentioned inorganic adhesive is, for example, at least one salt selected from the group consisting of an alkali metal salt, an alkaline earth metal salt, and a phosphate salt. Specific examples of alkali metal salts include alkali metal silicates, such as sodium silicate, potassium silicate, and lithium silicate. Specific examples of alkaline earth metal salts include alkaline earth metal silicates, such as magnesium silicate and calcium silicate. Specific examples of phosphate salts include aluminum phosphate, magnesium phosphate, and calcium phosphate. One type of these components may be alone, or combination of two or more types may be used.

A liquid containing the above-mentioned inorganic adhesive may be coated on the surface of the body portion 1, followed by the drying process to form the surface layer 5. The content of the inorganic adhesive (the above-mentioned salts) in the surface layer 5 is, for example, from 1 to 50 g/m$^2$, and may be from 2 to 40 g/m$^2$ or from 5 to 30 g/m$^2$. The amount of the inorganic adhesive in the surface layer 5 may be set as appropriate depending on adhesiveness required for the mat material 10 to other members.

The surface layer 5 may contain inorganic colloidal particles. While various types of fine particles of inorganic materials can be used to form the inorganic colloidal particles, preferred inorganic materials include metal oxides, nitrides, and carbides, as well as materials preferably having heat resistance. For example, preferred examples include, but not limited to, silica, alumina, mullite, zirconia, magnesia, and titania. Examples of other suitable materials include boron nitride and boron carbide. Those inorganic materials may be used individually or in combination of two or more thereof.

While above-mentioned inorganic colloidal particles can be used in various particle sizes in accordance with the type of the inorganic material and the desired friction-improving effect, it is generally preferred that they have an average particle size from about 1 to 100 nm. In a case where the inorganic colloidal particles have an average particle size of less than 1 nm, such inorganic colloidal particles are incapable of forming a friction layer that can contribute to the friction-increasing effect. In contrast, in a case where the inorganic colloidal particles have an average particle size greater than 100 nm, the particles may be too large to appropriately contribute to increasing the friction and result in falling off. The average particle size of the inorganic colloidal particles is more preferably in the range from about 10 to 80 nm, and most preferably in the range from about 20 to 50 nm. With regard to the inorganic colloidal particles, WO 2007/030410 may be referenced.

The inorganic adhesive may also comprise inorganic fillers such as clays (kaolin), boehmite, titanium dioxide, fumed silica, fumed alumina, precipitated silica, ATH and other compatible common fillers to modify viscosity and absorption properties.

The inorganic adhesive may also contain humectants such as glycerin, sorbitol, other sugar alcohols, and ethylene glycol. These materials can help plasticize the inorganic adhesive to improve handling properties.

Compatible dyes and pigments may also be incorporated to help identify the presence and location of the inorganic adhesive. Compatible surfactants can also be included to help wet the surfaces where adhesion is desired.

The surface layer 5 may further contain inorganic fibers as necessary. Diameters of the inorganic fibers may be from about 1 nm to about 15 nm, they are, for example, about 1 nm or greater, about 2 nm or greater, or about 3 nm or greater, and may be about 15 nm or smaller, about 8 nm or smaller, or about 5 nm or smaller. Inorganic fibers having a diameter of about 1 nm or greater have the advantage of being easily available compared to inorganic fibers thinner than 1 nm. In addition, during production of the pollution control apparatus, such inorganic fibers tend to be able to suppress scattering of the fiber pieces. On the other hand, inorganic fibers having a diameter of about 15 nm or smaller tend to be able to suppress the generation of fiber pieces during production of the device compared to inorganic fibers thicker than about 15 nm. The average length of the inorganic fibers is, for example, from about 500 to about 5000 nm, and may be from about 1000 to about 4000 nm or from about 1400 to about 3000 nm.

The diameter (average diameter) and average length (average fiber length) of the inorganic fibers can be determined by measuring the thicknesses and lengths of e.g., 50 or more fibers randomly sampled from microscopic images (TEM images, SEM images, and the like), and calculating the average values thereof. The aspect ratio of the inorganic fibers is calculated by dividing the value of the average length by the value of the diameter.

The average length of the above-mentioned inorganic fibers is, for example, from about 60 to about 2000, and may be from about 100 to about 1500 nm or from about 300 to about 800 nm. Inorganic fibers with an aspect ratio of about 60 or greater tend to be able to suppress the scattering of fiber pieces during production of the device compared to inorganic fibers having a smaller aspect ratio than about 60. On the other hand, inorganic fibers with an aspect ratio of about 2000 or smaller have the advantage of being easily available compared to inorganic fibers having a larger aspect ratio than about 2000. With regard to the inorganic fibers, JP 2017-210815 may be referenced.

The body portion 1 mainly constitutes of the inorganic fibers. Specific examples of the inorganic fibers constituting the body portion 1 include glass fibers, ceramic fibers, carbon fibers, silicon carbide fibers, and boron fibers, but other inorganic fibers may be used as necessary. One type of the inorganic fibers selected from those listed above may be alone or combination of two or more types may be used. Also, the inorganic fibers may be used in the form of composite fibers. Particularly preferred among them are ceramic fibers such as alumina fibers, silica fibers, and alumina-silica fibers. One type of the ceramic fibers may be used alone or combination of two or more types may be used. Also, the ceramic fibers may be used in the form of composite fibers. Intumescent materials such as unexpanded vermiculite may also be contained within the body portion 1 in a concentration from about 5 to about 50% of the total body portion 1 weight.

The body portion 1 contains mainly inorganic fibers, and has an organic binder as an optional additive. There are two representative production methods thereof, a dry process and a wet process.

In the dry process, for example, an alumina fiber precursor is obtained first, by spinning a sol-gel including a mixture of an alumina source such as aluminum oxychloride, a silica source such as silica sol, an organic binder such as polyvinyl alcohol, and water. This is followed by laminating the alumina fiber precursor in a sheet form, then needle-punching the laminate, and baking at a high temperature ranging from about 1000 to 1300° C. to obtain the body portion 1. The needle-punching density is, for example, from about 1 to 50 punches/cm$^2$, and by changing this density, the thickness, bulk specific gravity, and strength of the mat can be adjusted. On the other hand, in the wet process, the body portion 1 is obtained by mixing the inorganic fibers and the organic binder as starting materials with an optional additive, followed by continuously performing the steps of opening the inorganic fibers, preparing a slurry, molding by paper making, applying pressure to the mold, and the like. For details about the wet process (wet lamination process), WO 2004/061279 and U.S. Pat. No. 6,051,193 may be referenced. Note that the type and the amount used of the organic binders are not particularly limited. For example, acrylic resins, styrene-butadiene resins, acrylonitrile resins, polyurethane resins, natural rubber, polyvinyl acetate resins, and the like, provided in the form of latex, can be used as the organic binders. Alternatively, thermoplastic resins such as unsaturated polyester resins, epoxy resins, polyvinyl ester resins may be used as the organic binders.

The method of producing the mat material 10 according to the embodiment includes: providing the body portion 1; coating a liquid containing an inorganic adhesive onto at least one of the first surface 1a or the second surface 1b of the body portion 1; and applying heat to the body portion 1 after coating the above-mentioned liquid. According to the above-mentioned production method, the mat material 10, wherein the surface layer 5 is formed on at least one surface of the body portion 1, can be obtained.

Note that in a case where a mat including the organic binder and/or the inorganic fibers including the inorganic fine particles is used as the body portion 1, a step (step (a)) of impregnating a colloidal solution containing the organic binder and/or inorganic fine particles to the mat including the inorganic fibers is performed prior to the formation of the surface layer 5.

In a case where the mat contains the inorganic fine particles therein, the composition of the colloidal solution particles may be preferably adjusted in the step (a) such that the content of the fine particles is from about 1 to about 10 mass % based on the total mass of the body portion 1. With the content of the inorganic fine particles about 1 mass % or greater, a sufficient surface pressure is readily obtained, and with the content of the inorganic fine particles about 10 mass % or less, a flexibility sufficient to wrap the mat material 10 around the pollution control element is readily obtained.

Note that a step of drying the mat impregnated with the colloidal solution is performed as necessary. Also note that such drying of the colloidal solution can be performed together with other drying steps. For example, such a step can also be combined with the drying step of the inorganic adhesive, which is to be performed after the step of forming the surface layer 5. Alternatively, such a step can also be combined with the drying step after coating other solutions. The drying of the colloidal solution is done, for example, in a warm air dryer set at about 80 to about 250° C. for about 10 to about 180 min.

The liquid used for the formation of the surface layer 5 contains the inorganic adhesives and components (inorganic fibers and/or inorganic fine particles) that are compounded as necessary. Coating of the liquid onto the surface of the body portion 1 may be performed, for example, by spray coating, roll coating, film transfer, curtain coating, and the like. The coating amount per unit area (mass of solid) is, for example, from about 1 to about 200 $g/m^2$, in one embodiment. Additionally, the coating amount may also be from about 10 to about 175 $g/m^2$ per unit area, in one embodiment. The coating amount may also be from about 20 to about 150 $g/m^2$ per unit area. The drying step after coating is for forming the surface layer 5 by volatilizing water. For example, the body portion 1 after coated with the solution may be dried in a warm air dryer set at about 75 to about 250° C. for about 10 to about 180 min. Thereby, the surface layer 5 is formed on the surface of the body portion 1. The coating of the inorganic adhesive may be formed on a part of one of the surface layers, for example, in a pattern of stripe and the like.

The step of forming the surface layer 5 may be divided into a plurality of steps and performed. For example, first, the liquid containing the inorganic adhesive may be coated onto the surface of the body portion 1, and then the liquid containing other components may be coated onto the surface of the body portion 1. The order may be reversed, i.e., first, the liquid containing other components may be coated onto the surface of the body portion 1, and then the liquid containing the inorganic adhesive may be coated onto the surface of the body portion 1. The inorganic adhesive may be applied to either a wet or dry body portion 1.

Figure 3:
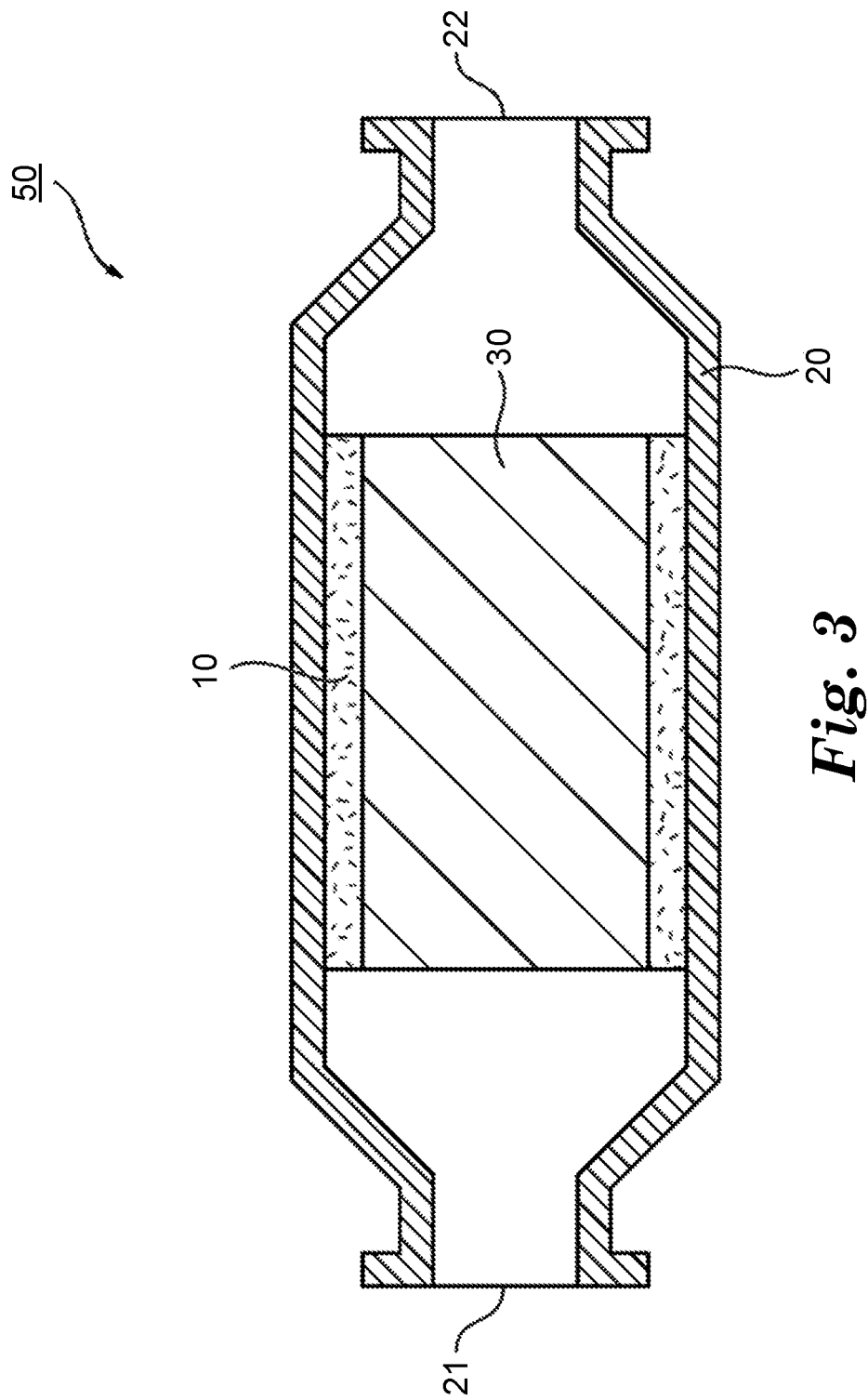
FIG. 3 is a cross sectional view schematically illustrating one embodiment of the pollution control apparatus according to the present disclosure.

The mat material 10 is used, as illustrated in FIG. 3, to hold a pollution control element 30 in a pollution control apparatus 50. Specific examples of the pollution control element 30 include a catalyst carrier, a filter element, and the like for cleaning exhaust gases from engines. Specific examples of the pollution control apparatus 50 include a catalytic converter and an exhaust cleaning device (e.g., a diesel particulate filter device).

The pollution control apparatus 50 illustrated in FIG. 3 includes a casing 20, the pollution control element 30 provided in the casing 20, and the mat material 10 disposed between an inner surface of the casing 20 and an outer surface of the pollution control element 30. The pollution control apparatus 50 further includes a gas flow inlet 21 that introduces exhaust gas to the pollution control element 30; and a gas flow outlet 22 that discharges exhaust gas that has passed through the pollution control element 30.

In the pollution control apparatus 50, the mat material 10 is disposed in a sandwiched state between the inner surface of the casing 20 and the outer surface of the pollution control element 30. The width of the gap between the inner surface of the casing 20 and the outer surface of the pollution control element 30 is preferably from about 1.5 to about 15 mm from the viewpoint of ensuring airtightness and reducing the use amount of the mat material 10. The mat material 10 is preferably in a state of being appropriately compressed such that the mat material 10 can be fixed to other members abutting thereon upon being heated. The mat material 10 is fixed to the inner surface of the casing 20 and to the outer surface of the pollution control element 30, and thus the shift in position of the pollution control element 30 in the pollution control apparatus 50 can be highly suppressed. In addition, the bulk density of the assembly can be set lower compared to materials in the related art, and thus the amount of the relatively expensive inorganic fiber material used can be reduced. Examples of the technique for compressing and assembling the mat material 10 include clamshell technique, stuffing technique, and tourniquet technique.

The pollution control element 30 reaches a high temperature upon passage therethrough of a high-temperature exhaust gas. The portion between the pollution control element 30 and the mat material 10 is heated to as high as 200 to 1100° C. On the other hand, the portion between the mat material 10 and the casing 20 is heated to as high as 100 to 800° C. The pollution control apparatus 50 includes the mat material 10 having the surface layer 5 that exhibits adhesiveness upon being heated, and thus can firmly hold the pollution control element 30 in the casing 20.

A catalyst to be carried by the catalyst carrier is generally a metal (e.g., platinum, ruthenium, osmium, rhodium, iridium, nickel, and palladium) and a metal oxide (e.g., vanadium pentoxide, and titanium dioxide), and is preferably used in a form of coating. Note that the pollution control apparatus can be constructed as a diesel particulate filter or a gasoline particulate filter by applying a filter element in place of the catalyst carrier.

Figure 4:
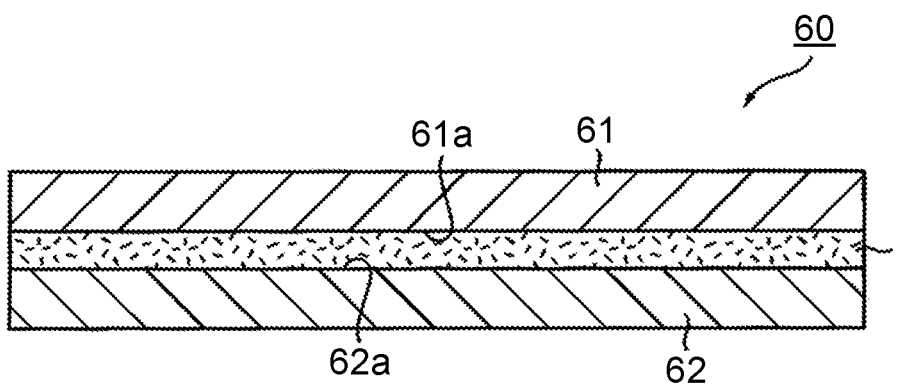
FIG. 4 is a cross sectional view schematically illustrating the thermal insulation structure according to the present disclosure.

Embodiments of the present disclosure have been described in detail, but the present invention is not limited to the above-mentioned embodiments. For example, the above-mentioned embodiments have been illustrated by the examples where the mat material 10 is applied to the pollution control apparatus, but the mat material 10 may be applied to a thermal insulation structure including a heat source, such as an exhaust manifold and an exhaust pipe, or an exhaust system part through which a high-temperature fluid flows, and a heat shield cover installed therearound. As briefly illustrated in FIG. 4, a thermal insulation structure 60 includes: a first member 61 (e.g., a heat source or an exhaust system part through which a high-temperature fluid flows) having a surface 61a having a temperature potentially reaching 200° C. or higher; a second member 62 (e.g., a heat shield cover) having a surface 62a opposite to the surface 61a of the first member 61; and a mat material 10 disposed between the first member 61 and the second member 62. A heat from the first member 61, which can raise the temperature not lower than 200° C., prompts an inorganic adhesive of the mat material 10 to exhibit adhesiveness. Adhesiveness of the inorganic adhesive can suppress the shift in position of the mat material 10 in the thermal insulation structure 60.

EXAMPLES

The present disclosure will be described with reference to examples thereof. It is needless to say that the present invention is not limited by these examples.

Preparation of Body Portion

Chemicals listed below were introduced to 10 L of water while stirring at an interval of 1 min to prepare a colloidal solution containing an organic binder and inorganic fine particles.
- (1) Aluminum sulfate (aqueous solution with a solid content concentration of 40%): 6 g
- (2) Organic binder (Acrylic Latex LX874 (trade designation), available from Zeon Corporation): 2.6 g
- (3) Colloidal silica (Snowtex O (trade designation), available from Nissan Chemical Industries, Ltd.): 10 g
- (4) Liquid sodium aluminate (solid content 40%): 3.5 g A needle-punched alumina fiber blanket (Maftec MLS-2 Blanket (trade designation), available from Mitsubishi Chemical Corporation) was cut out in 15 cm×40 cm. This was placed on a metal mesh, the above-mentioned colloidal solution was poured from above, and then water was removed by aspiration on the metal mesh for 15 sec. Thus, the above-mentioned colloidal solution was impregnated into the blanket, and then a drying process was performed in a warm air dryer set at a temperature of 170° C. for 45 min. Thereby, the body portion of the mat material was prepared.

Aqueous Solution Containing Inorganic Adhesive

Aqueous solution 1: An aqueous solution of sodium silicate (Sodium Silicate No. 3, available from Fuji Kagaku Corp.) diluted to a concentration of 50% was prepared.

Aqueous solution 2: An aqueous solution of aluminum phosphate (WR-100B, available from Taki Chemical Co., Ltd.) diluted to a concentration of 50% was prepared.

Example 1

The aqueous solution 1 (sodium silicate aqueous solution) was coated onto the first surface (carrier side surface) of the body portion, as follows: The aqueous solution 1 was spray-coated onto the entire surface of the first surface to a coated amount of 20 g/m² in terms of solid content. Then a drying process was performed in a warm air dryer set at a temperature of 170° C. for 5 min. Thereby, an area containing the inorganic adhesive was formed on the entire surface of the first surface. In the same manner as above, an area containing the inorganic adhesive was formed also on the entire surface of the second surface (casing side surface) of the body portion.

Example 1a

A mat material according to this example was prepared in the same manner as in Example 1 except that the coated amounts (in terms of solid content) of the aqueous solution 1 (sodium silicate aqueous solution) onto the first and second surfaces were 2 g/m² each instead of 20 g/m² each.

Example 1b

A mat material according to this example was prepared in the same manner as in Example 1 except that the coated amounts (in terms of solid content) of the aqueous solution 1 (sodium silicate aqueous solution) onto the first and second surfaces were 40 g/m² each instead of 20 g/m² each.

Example 2

A mat material according to this example was prepared in the same manner as in Example 1 except that the aqueous solution 2 (aluminum phosphate aqueous solution) was used instead of the aqueous solution 1 (sodium silicate aqueous solution).

Comparative Example 1

A body portion (having no area containing the inorganic adhesive) prepared in the same manner as in Example 1 was used as a mat material according to this example.

Assessment of Adhesiveness Upon being Heated

Figure 5:
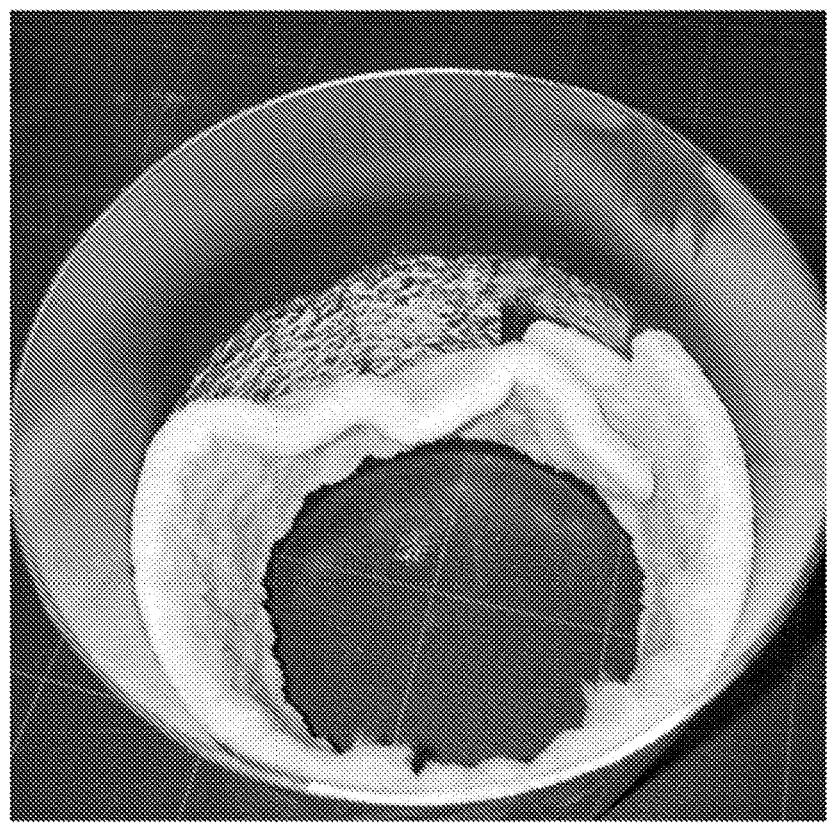
FIG. 5 is a photograph showing a state where a part of the mat material (using aluminum phosphate as an inorganic adhesive) is fixed to an inner surface of the casing.

Whether the mat materials of the above-mentioned Examples and Comparative Example exhibit adhesiveness upon being heated was assessed as follows: The mat material was cut out in a width of 75 mm and a length of 350 mm, and wrapped around an outer circumference of a cylindrical-shaped catalyst carrier (HONEYCERAM (trade designation), available from NGK Insulators, Ltd.) having a length of 115 mm and an outer diameter of 105 mm. This was press fitted at 40 mm/see into a cylindrical stainless steel casing having a length of 150 mm and an inner diameter of 114 mm using a guide cone. Thus, prepared converter samples were heated at 600° C. for 1 hour, and then the catalyst carriers were pulled out such that the mat material and the casing did not shift in position: those samples where a part of the mat material was fixed to the inner surface of the casing thereafter were assessed as having adhesiveness to the casing. The results are shown in Table 1. Note that FIG. 5 is a photograph showing a state where a part of the mat material is fixed to the inner surface of the casing.

Figure 6:
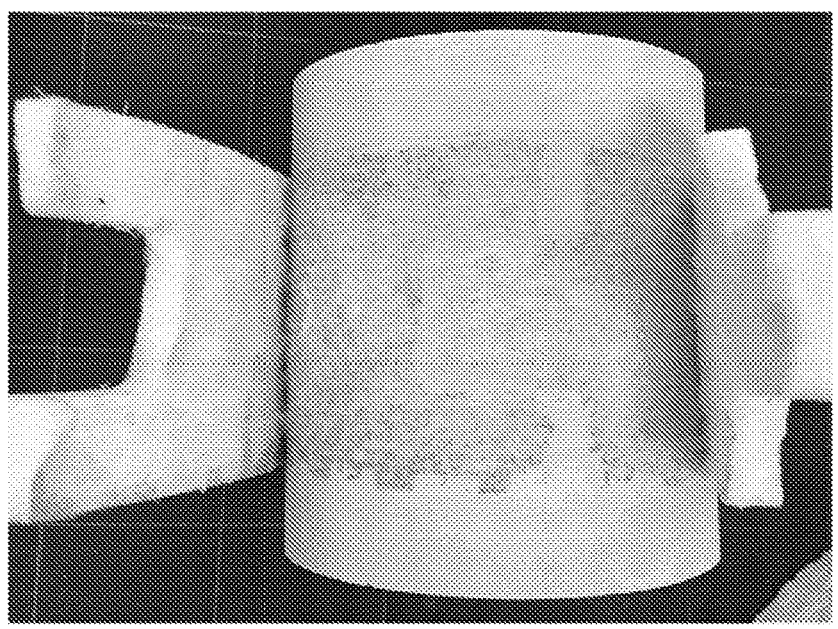
FIG. 6 is a photograph showing a state where a part of the mat material (using sodium silicate as an inorganic adhesive) is fixed to an outer surface of a catalyst carrier.

The converter samples prepared in the same manner as described above were heated at 600° C. for 1 hour, and then these were pulled out of the casings such that the mat material and the catalyst carrier did not shift in position. Those samples where a part of the mat material was fixed to the outer surface of the catalyst carrier thereafter were assessed as having adhesiveness to the catalyst carrier. The results are shown in Table 1. Note that FIG. 6 is a photograph showing a state where a part of the mat material is fixed to the outer surface of the catalyst carrier.

TABLE 1

| | | Example 1 | Example 1a | Example 1b | Example 2 | Comparative Example 1 |
|---|---|---|---|---|---|---|
| Inorganic adhesive | Type | Sodium silicate | Sodium silicate | Sodium silicate | Aluminum phosphate | — |
| | Coated amount (g/m², solid) | 20 | 2 | 40 | 20 | — |
| Presence of adhesiveness | Inner surface of casing | Yes | Yes | Yes | Yes | No |
| | Outer surface of catalyst carrier | Yes | Yes | Yes | Yes | No |

Example 3

A colloidal solution was prepared by diluting alumina sol AS520 (available from Nissan Chemical Industries, Ltd., solid concentration: 20 mass %) with water to a solid concentration of 5 mass %. This colloidal solution was coated onto the first surface (carrier side surface) of the body portion as follows: The aqueous solution 1 was coated by a Spray Gun PS-9513 (trade designation, available from Anest Iwata Corporation) onto the first surface at a coated amount of 5 g/m² in terms of solid content. Then, in the same manner as in Example 1, the aqueous solution 1 (sodium silicate aqueous solution) was spray-coated onto the first surface at a coated amount of 20 g/m² in terms of solid content. Then the drying process was done in a warm air dryer set at a temperature of 170° C. for 5 min. Thereby, an area containing the inorganic fibers and the inorganic adhesive was formed on the entire surface of the first surface. In the same manner as above, an area containing the inorganic fibers and the inorganic adhesive was formed also on the second surface (casing side surface) of the body portion.

Example 4

Areas containing the inorganic fibers and the inorganic adhesive were formed on both surfaces of the body portion in the same manner as in Example 3 except that the order of spraying the above-mentioned colloidal solution (alumina sol aqueous solution) and the aqueous solution 1 (sodium silicate aqueous solution) was changed; that is, the aqueous solution 1 (sodium silicate aqueous solution) was sprayed, and then the colloidal solution (alumina sol aqueous solution) was sprayed.

Measurement of Force Required for Pulling Out Catalyst Carrier

Pull-out force of the catalyst carrier was measured on the mat materials according to Examples 1 to 4 and Comparative Example 1 as follows: A heater was installed such that an outer surface of a cylindrical-shaped catalyst carrier (HONEYCERAM (trade designation, available from NGK Insulators, Ltd.) having a length of 115 mm and an outer diameter of 105 mm could be heated. The mat material was cut out in a width of 75 mm and a length of 350 mm, and wrapped around an outer circumference of the catalyst carrier. This was press fitted at 40 mm/see into a cylindrical stainless steel casing having a length of 150 mm and an inner diameter of 114 mm using a guide cone. After 24 hours of the press fitting, this was heated and the temperature between the catalyst carrier and the mat material reached 900° C., and the temperature between the mat material and the casing reached 600° C. After these temperatures were reached, the force (N) was measured when pulling out the catalyst carrier from the stainless steel casing at 40 mm/sec. From the maximum force (N) during the measurement, the force required to pull out the catalyst carrier (force per unit area of the mat material in N/cm²) was calculated. The results are shown in Table 2.

TABLE 2

|  |  | Example 1 | Example 2 | Example 3 | Example 4 | Comparative Example 1 |
|---|---|---|---|---|---|---|
| Inorganic adhesive | Type | Sodium silicate | Sodium silicate | Sodium silicate | Aluminum phosphate | — |
|  | Coated amount (g/m², solid) | 20 | 20 | 20 | 20 | — |
| Inorganic fibers | Alumina sol | — | — | Alumina sol | Alumina sol | — |
|  | Coated amount (g/m², solid) | — | — | 5 | 5 | — |

TABLE 2-continued

|  | Example 1 | Example 2 | Example 3 | Example 4 | Comparative Example 1 |
|---|---|---|---|---|---|
| Force required to pull out catalyst carrier (N/cm²) | 3.4 | 3.2 | 3.1 | 2.9 | 2.5 |

Example 5

The aqueous solution 1 (sodium silicate aqueous solution) was coated onto the first surface (carrier side surface) of the body portion as follows: The aqueous solution was coated dropwise onto the surface to a coated amount of 20 g/m² in terms of solid content. The drops were deposited across the web width in rows with a spacing between the rows of ½ inch and a spacing between dots of ½ inch. Then a drying process was performed in a warm air drier set at a temperature of 170 C for 5 minutes. Thereby an area containing the inorganic adhesive was formed with discrete drops evenly distributed on the entire surface of the first surface. In the same manner as above, an area containing the inorganic adhesive was formed with discrete drops evenly distributed on the entire surface of the second surface (casing side surface) of the body portion.

While both surfaces were coated in Example 5, it is also contemplated that only the first or second surface could be coated. The amount applied to the surfaces could differ from that described in Example 5. The distance between the rows of dots could also differ, for example anywhere from about ¼ inch to about 2 inches.

Example 6

The aqueous solution 1 (sodium silicate aqueous solution) was coated onto the first surface (carrier side surface) of the body portion as follows: The aqueous solution was coated in stripes onto the surface to a coated amount of 20 g/m² in terms of solid content. The stripes were deposited across the web width with a spacing between the stripes of ½ inch. Then a drying process was performed in a warm air drier set at a temperature of 170 C for 5 minutes. Thereby an area containing the inorganic adhesive was formed with discrete stripes evenly distributed on the entire surface of the first surface. In the same manner as above, an area containing the inorganic adhesive was formed with discrete stripes evenly distributed on the entire surface of the second surface (casing side surface) of the body portion.

While both surfaces were coated in Example 6, it is also contemplated that only the first or second surface could be coated. The amount applied to the surfaces could differ from that described in Example 6. The distance between the stripes could also differ, for example anywhere from about ¼ inch to about 2 inches. Additionally, while the stripes of Example 6 are envisioned as straight, it is also contemplated that non-straight stripes are also possible. For example, stripes may zig-zag or be applied as a sine wave, etc.

Example 7

A needle-punched alumina fiber blanket (3M 1600HTE 1474 basis weight available from 3M Company, St. Paul MN) was cut to 84 cm×520 cm.

An adhesive solution was prepared by mixing 950 grams of PQ Type N sodium silicate available from PQ corporation Valley Forge PA, 50 grams of glycerin and 1 gram of acid blue AE03 available from Clariant Corporation Muttenz Switzerland.

The adhesive solution was sprayed on to the needle-punched blanket using a 3M_16570 Accuspray Model HG18 Spray Gun with a 2 mm fluid tip. Three separate samples were coated with 66, 132, and 273 grams per square meter of wet adhesive. After drying in an oven for 45 minutes at 75° C. the dry coating weights were 32, 64, and 139 grams per square meter respectively.

From each coated sample, test specimens 44.5×44.5 mm were cut. A piece of 316 stainless steel shim (0.05×50×150 mm) available from Maudlin Products part number 316-002-12-100 was positioned evenly between the test specimens with the adhesive coating facing the stainless steel shim. The assembly consisting of the adhesive coated specimen/shim/specimen was place between two heated 44.5×44.5 mm platens (with horizontal grooves to prevent slippage) at a pressure of 10 psi (68.9 kPa) and held at the noted temperature for 10 minutes. After 10 minutes the shim was removed (pulled vertically) from the assembly at 100 mm/minute while the force was recorded. Evidence of bond formation (presence of adhesive or fiber on the shim, or specimen separation) was noted. See table 3 for results of each temperature set point and adhesive coating weight (gsm). Forces in Table 3 are lbs-force. It is noted that once the bonding point was determined, it was not necessary to test all temperature ranges.

TABLE 3

| Temperature | 32 gsm adhesive | | 64 gsm adhesive | | 139 gsm adhesive | | no adhesive | |
|---|---|---|---|---|---|---|---|---|
| | Force | Bond | Force | Bond | Force | Bond | Force | Bond |
| 20 C. | 18.3 | N | | | | | | |
| 50 C. | 19.8 | N | | | | | 16.2 | N |
| 75 C. | 15.46 | N | | | 14 | N | 14.9 | N |
| 100 C. | 14.5 | N | 15.25 | N | 18.5 | Y | 12.4 | N |
| 125 C. | 14.2 | N | 19.3 | Y | 18.7 | Y | 11.1 | N |
| 150 C. | 18.4 | Y | 21.1 | Y | | | 10.5 | N |
| 175 C. | 18.5 | Y | 19.5 | Y | | | 9.9 | N |
| 200 C. | 13 | Y | | | | | 10.9 | N |

According to the present disclosure, a mat material applied to an apparatus or a structure used under heating environment is provided, and with the mat material, a shift in position of the mat material and other members in contact therewith during use can be suppressed.

The invention claimed is:

1. A mat material configured to be used in a sandwiched state between two members of a device that exhibits an operating temperature, where before the device reaches the operating temperature for the first time, the mat material comprises:
    a body portion; wherein the body portion is a single layered material, wherein the single layered material comprises inorganic fibers and has a first surface and a second surface; and
    wherein the inorganic fibers of the body portion do not extend beyond 1) the first surface and 2) the second surface;
    a layer of inorganic adhesive on the first surface or the second surface of the body portion, wherein the coated inorganic adhesive is substantially dry;
    wherein the inorganic adhesive in its substantially dry state exhibits adhesiveness upon being heated to the operating temperature, and
    wherein the inorganic adhesive comprises an alkali metal silicate.

2. The mat material according to claim 1, which is substantially dry such that, after being heated at a temperature of 120° C. for 30 min, the mat material exhibits a mass loss of less than or equal to about 5% based on the mass of the mat material before being heated.

3. The mat material according to claim 1, wherein the alkali metal silicate is at least one selected from the group consisting of sodium silicate, potassium silicate, and lithium silicate.

4. The mat material according to claim 1, wherein the content of the alkali metal silicate is from 1 to 50 g/m² in the inorganic adhesive.

5. The mat material according to claim 1, wherein inorganic adhesive is formed on both of the first and second surfaces of the body portion.

6. The mat material according to claim 1, wherein the inorganic adhesive is formed on an entire surface of at least one of the first or second surfaces of the body portion.

7. The mat material according to claim 1, wherein the inorganic adhesive is formed on a part of at least one of the first or second surfaces of the body portion.

8. The mat material according to claim 1, wherein inorganic adhesive contains inorganic colloidal particles.

9. The mat material according to claim 8, wherein the inorganic colloidal particles are alumina.

10. The mat material according to claim 1, wherein the inorganic adhesive contains inorganic fibers with an aspect ratio from 60 to 2000.

* * * * *